United States Patent [19]

Barker

[11] Patent Number: 4,563,751
[45] Date of Patent: Jan. 7, 1986

[54] CARRY PROPAGATE ADDER CIRCUIT WHICH DIFFERENTIALLY SENSES A CARRY INPUT

[75] Inventor: Charles E. Barker, Round Rock, Tex.

[73] Assignee: Motorola, Inc., Schaumburg, Ill.

[21] Appl. No.: 604,252

[22] Filed: Apr. 26, 1984

[51] Int. Cl.[4] ............................................. G06F 7/50
[52] U.S. Cl. ................................................. 364/786
[58] Field of Search ..................... 364/786, 787, 784

[56] References Cited

U.S. PATENT DOCUMENTS

| | | | |
|---|---|---|---|
| 4,052,604 | 10/1977 | Maitland et al. | 364/786 |
| 4,357,675 | 11/1982 | Freyman | 364/786 |
| 4,422,157 | 12/1983 | Uhlenhoff | 364/786 |
| 4,425,623 | 1/1984 | Russell | 364/786 |
| 4,439,835 | 3/1984 | Best et al. | 364/786 |
| 4,471,454 | 9/1984 | Dearden et al. | 364/786 |

*Primary Examiner*—David H. Malzahn
*Attorney, Agent, or Firm*—Anthony J. Sarli, Jr.; Jeffrey Van Myers; Robert L. King

[57] ABSTRACT

A fast carry propagate adder circuit which differentially senses a carry input bit with a sense amplifier is provided. First and second carry bit conductors are precharged to an equal voltage potential by a precharge portion. A voltage differential between the two carry bit conductors is sensed to provide both an output sum bit and an output carry bit in response to two input sum bits, an input carry bit and the complement of the input carry bit.

11 Claims, 1 Drawing Figure

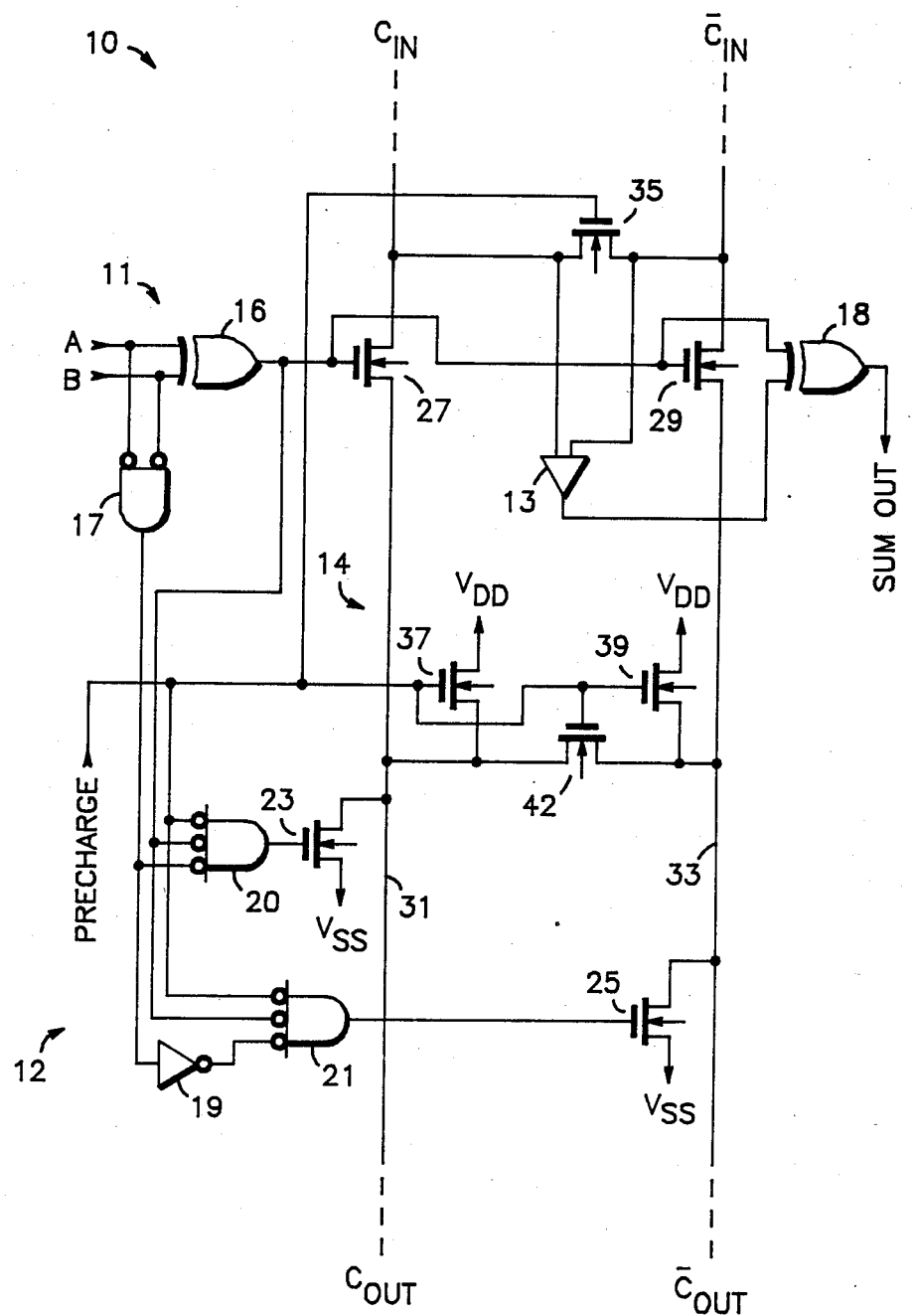

CARRY PROPAGATE ADDER CIRCUIT WHICH DIFFERENTIALLY SENSES A CARRY INPUT

TECHNICAL FIELD

This invention relates generally to adder circuits and, more particularly, to carry propagate adder circuits.

BACKGROUND ART

Carry propagate adder circuits are typically coupled in parallel for receiving input bits in parallel and for providing output sum bits in parallel. A carry input bit is coupled to a single ended carry line which is coupled to each adder circuit. The input carry bit in conjunction with the output sum bit of each adder circuit cause a carry bit having either a high or a low logic level to propagate along the carry line. Conventional precharging circuitry is used to precharge the carry line to a predetermined logic level before the sum operation is executed. An output carry bit is provided by the carry line. However, the correct sum is not provided until the carry bit has propagated along the carry line at each adder circuit. The disadvantage of using a plurality of parallel connected carry propagate adder circuits is that the addition process is very slow due to the time required for the carry bit to be propagated along each adder circuit.

SUMMARY OF THE INVENTION

Accordingly, an object of the invention is to provide an improved carry propagate adder circuit.

Another object of the present invention is to provide an improved carry propagate adder circuit which differentially senses a carry input.

Yet another object of the present invention is to provide an improved carry propagate adder circuit having fast carry bit generation.

In carrying out the above and other objects of the present invention, there is provided, in one form, a carry propagate adder circuit for adding first and second input bits in conjunction with an input carry bit, having sum bit generation means for receiving the first and second input bits and for providing an output sum bit. The adder circuit also has carry output bit generation means for providing a carry output bit in response to both the input sum bits and the input carry bit. First and second carry bit conductors are provided for receiving the input carry bit and the complement thereof, respectively. First and second output terminals of the two carry bit conductors provide the carry output bit and the complement thereof. Precharge means are coupled to the input terminals of the carry bit conductors for selectively charging the first and second carry bit conductors to a predetermined voltage level. Sense amplifier means for sensing a difference in the voltage levels of the first and second carry bit conductors have first and second inputs coupled to the first and second input terminals of the carry bit conductors. An output of the sense amplifier means is coupled to the sum bit generation means for providing, in part, the output sum bit.

The above and other objects, features and advantages of the present invention will be more clearly understood from the following detailed description taken in conjunction with the accompanying drawings.

BRIEF DESCRIPTION OF THE DRAWING

The single FIGURE illustrates in partial schematic form a carry propagate adder circuit in accordance with the present invention.

DESCRIPTION OF THE PREFERRED EMBODIMENT

Shown in the single FIGURE is a carry propagate adder circuit 10 having a sum bit generation portion 11, a carry bit generation portion 12, a differential carry bit sense portion 13, and a precharge portion 14. Although specific N-channel MOS devices are shown, it should be clear that adder circuit 10 could be implemented by completely reversing the processing techniques (e.g. N-channel to P-channel) or by using other types of transistors.

Referring to the single FIGURE, sum bit generation portion 11 generally comprises an exclusive OR gate 16 having a first input coupled to a first input sum bit A. A second input of exclusive OR gate 16 is coupled to a second input sum bit B. A first input of a NOR gate 17 is connected to the first input of exclusive OR gate 16, and a second input of NOR gate 17 is connected to the second input of exclusive OR gate 16. Sum bit generation portion 11 also comprises an exclusive OR gate 18 having a first input coupled to the output of exclusive OR gate 16.

Carry bit generation portion 12 generally comprises an inverter 19, a NOR gate 20, a NOR gate 21, an N-channel transistor 23, an N-channel transistor 25, an N-channel transistor 27, and an N-channel transistor 29. An input of inverter 19 and a first input of NOR gate 20 are connected together and to an output of NOR gate 17. A second input of NOR gate 20 is connected to both a second input of NOR gate 21 and an output of exclusive OR gate 16. NOR gate 20 has a third input coupled to a precharge signal and connected to a third input of NOR gate 21. An output of NOR gate 20 is connected to a gate of transistor 23. Transistor 23 has a source connected to a first supply voltage, say $V_{SS}$, and a drain connected to a first carry bit conductor 31. An output of NOR gate 21 is connected to a gate of transistor 25. Transistor 25 has a drain connected to a second carry bit conductor 33 and a source connected to supply voltage $V_{SS}$. Transistor 27 has a gate connected to the output of exclusive OR gate 16 and a source connected to the drain of transistor 23. A drain of transistor 27 forms an input terminal of carry bit conductor 31, and the drain of transistor 23 forms an output terminal of carry bit conductor 31. Transistor 29 has a gate connected to both the gate of transistor 27 and the output of exclusive OR gate 16. A source of transistor 29 is connected to the drain of transistor 25. A drain of transistor 29 forms an input terminal of carry bit conductor 33, and the drain of transistor 25 forms an output terminal of carry bit conductor 33. A carry input bit $C_{IN}$ is coupled to the input terminal of carry bit conductor 31, and the complement of the carry input bit is coupled to the input terminal of carry bit conductor 33.

In the illustrated form, carry bit sense portion 13 is a sense amplifier having a first input connected to the drain of transistor 27 and a second input connected to the drain of transistor 29. In a preferred form, an N-channel transistor 35 is provided having a drain and a source connected to the first and second inputs of carry bit sense portion 13, respectively. A gate of transistor 35 is coupled to a precharge signal. An output of the sense amplifier of carry bit sense portion 13 is connected to a second input of exclusive OR gate 18.

Precharge portion 14 generally comprises an N-channel transistor 37 having a gate coupled to the precharge signal, a source connected to both the source of transistor 27 and the drain of transistor 23, and a drain connected to a second supply voltage, say $V_{DD}$. In the illustrated form, supply voltage $V_{DD}$ is more positive than supply voltage $V_{SS}$. An N-channel transistor 39 has a drain connected to supply voltage $V_{DD}$, a gate connected to the gate of transistor 37 and coupled to the precharge signal, and a source connected to both the source of transistor 29 and the drain of transistor 25. An N-channel transistor 42 has a gate connected to the gates of transistors 37 and 39, a drain connected to the the source of transistor 37, and a source connected to transistor 39.

In operation, adder circuit 10 functions in accordance with the following truth table.

| A | B | $C_{IN}$ | SUM OUT | $C_{OUT}$ |
|---|---|---|---|---|
| 0 | 0 | 0 | 0 | 0 |
| 0 | 0 | 1 | 1 | 0 |
| 0 | 1 | 0 | 1 | 0 |
| 1 | 0 | 0 | 1 | 0 |
| 1 | 0 | 1 | 0 | 1 |
| 0 | 1 | 1 | 0 | 1 |
| 1 | 1 | 0 | 0 | 1 |
| 1 | 1 | 1 | 1 | 1 |

Initially, the precharge signal has a high logic level which enables transistors 37, 39 and 42 and couples supply voltage $V_{DD}$ to carry bit conductors 31 and 33. Transistor 42 functions as a shorting device which equalizes the voltage at the output terminals of carry bit lines 31 and 33. Although transistor 42 is not essential to practice the present invention, transistor 42 insures a uniform precharge voltage level for carry bit lines 31 and 33. Simultaneously, transistor 35 is made conductive and places the first and second inputs of carry bit sense amplifier 13 at equal voltage potential. It should be understood that transistor 35 is not essential to practice the present invention because during a precharge mode of operation, carry bit conductors 31 and 33 are both coupled to the same supply voltage. Therefore, the two inputs of sense amplifier 13 should be at equal voltage potential. However, transistor 35 further insures that the voltage potential at the inputs of sense amplifier 13 is identical. Input bits A and B which are to be added are coupled to the inputs of exclusive OR gate 16 and to NOR gate 17. As soon as the outputs of gates 16 and 17 have settled from inputs A and B, the precharge signal changes from a high logic level to a low logic level. An input carry bit is then coupled to the input terminal of carry bit conductor 31. A complement of the input carry bit is also coupled to carry bit line 33. Therefore, one of carry bit lines 31 and 33 will always change from a high logic level to a low logic level after the precharge mode. When the output of exclusive OR gate 16 is a logic one resulting from only one of input sum bits A and B being a logic one, transistors 27 and 29 are both made conductive and NOR gates 20 and 21 both provide logic zero outputs thereby disabling transistors 23 and 25. Therefore, the input carry bit coupled to each of carry bit conductors 31 and 33 is immediately coupled to the respective output terminal thereof and provided as a carry output and the complement thereof, respectively. Simultaneously, since the input terminals of carry bit conductors 31 and 33 are at different logic states, sense amplifier 13 outputs either a logic one signal or a logic zero signal to exclusive OR gate 18 depending upon whether or not the input terminal of carry bit conductor 31 is a logic one. When input carry bit $C_{IN}$ is a logic one, the output of sense amplifier 13 will also be a logic one. The output sum bit is determined also by the output of exclusive OR gate 16. Only if both input sum bits are logic zero or both are logic one will the output sum bit be a logic zero when the carry input bit is a logic zero.

Assuming, for the purpose of illustration only, that both input sum bits are a logic one, both outputs of exclusive OR gate 16 and NOR gate 17 will be a logic zero. The resulting output of NOR gate 20 is a logic one which enables transistor 23 and couples $V_{SS}$ to the output terminal of carry bit conductor 31. The supply voltage $V_{SS}$ represents a true logic level indicated by a "1" in the above table and is used to generate a carry output bit having a true logic level. Therefore, when both input bits are a logic one, a true logic level carry output bit is always generated regardless of the logic level of the carry input bit.

When only one of the input sum bits has a logic one value, the logic value of the output carry bit is determined by the logic value of the input carry bit. This is because when either input bit A or B has a logic one value, the outputs of NOR gates 20 and 21 are logic zeroes thereby disabling transistors 23 and 25, respectively.

The use of sense amplifier 13 and two carry bit sense lines or conductors allows the logic state of the carry input to be quickly sensed. Although the use of sense amplifier 13 requires two carry bit conductors, a sum bit can be quickly generated and outputted when a plurality of adder circuits such as circuit 10 is used. Fast circuit operation results from the ability to quickly sense a voltage differential between two carry bit conductors rather than propagating a carry bit through a plurality of adder circuits as was described in the background art. Because of the symmetrical nature of the circuitry which is coupled to carry bit conductors 31 and 33, there is equal or balanced loading of both carry bit conductors.

While the invention has been described in the context of a preferred embodiment, it will be apparant to those skilled in the art that the present invention may be modified in numerous ways and may assume many embodiments other than that specifically set out and described above. Accordingly, it is intended by the appended claims to cover all modifications of the invention which fall within the true spirit and scope of the invention.

I claim:

1. A carry propagate adder circuit for adding first and second input bits in conjunction with an input carry bit, having sum bit generation means for receiving the first and second input bits and providing an output sum bit and having carry output bit generation means for providing a carry output bit in response to the first and second input bits and the input carry bit, comprising:

first and second carry bit conductors having first and second input terminals for receiving the input carry bit and the complement thereof, respectively, and first and second output terminals for providing the carry output bit and the complement thereof, respectively;

precharge means coupled to the output terminals of the carry bit conductors, for selectively charging the first and second carry bit conductors to a predetermined voltage level; and sense amplifier means having first and second inputs coupled to the first and second input terminals of the carry bit conductors, respectively, and an output coupled to the sum bit generation means, for sensing a difference in the voltage levels of the first and second carry bit conductors.

2. The carry propagate adder circuit of claim 1 wherein the precharge means further comprise:
a first transistor having a first current electrode coupled to a terminal for receiving a supply voltage, a control electrode for receiving a precharge control signal, and a second current electrode coupled to the first carry bit conductor, for selectively coupling the supply voltage to the first carry bit conductor;

a second transistor having a first current electrode coupled to the supply voltage, a control electrode for receiving the precharge control signal, and a second current electrode coupled to the second carry bit conductor, for selectively coupling the supply voltage to the second carry bit conductor; and a third transistor having a first current electrode coupled to the second current electrode of the first transistor, a control electrode for receiving the precharge control signal, and a third current electrode coupled to the second current electrode of the second transistor, said third transistor selectively equalizing the voltage potential between the first and second carry bit conductors.

3. The carry propagate adder circuit of claim 2 wherein said first, second and third transistors are N-channel MOS transistors.

4. The carry propagate adder circuit of claim 1 wherein said sum bit generation means comprise:
first logic means having first and second inputs coupled to the first and second input bits and an output; and second logic means having a first input coupled to the output of the first logic means, a second input coupled to the output of the sense amplifier means, and an output, for providing the output sum bit.

5. The carry propagate adder circuit of claim 4 wherein said carry output bit generation means comprise:
third logic means having first and second inputs coupled to the first and second input bits, and an output;

fourth logic means having a first input coupled to a precharge control signal, a second input coupled to the output of the first logic means, a third input coupled to the output of the third logic means, and an output;

inverter means having an input coupled to the output of the third logic means, and an output;

fifth logic means having a first input coupled to the output of the inverter means, a second input coupled to the output of the first logic means, a third input coupled to the precharge control signal, and an output;

a first transistor having a control electrode coupled to the output of the fourth logic means, a first current electrode coupled to the output terminal of the first carry bit conductor, and a second current electrode coupled to a supply voltage, for selectively coupling the supply voltage to the output terminal of the first carry bit conductor;

a second transistor having a control electrode coupled to the output of the fifth logic means, a first current electrode coupled to the output terminal of the second carry bit conductor, and a second current electrode coupled to the supply voltage, for selectively coupling the supply voltage to the output terminal of the second carry bit conductor;

a third transistor having a control electrode coupled to the output of the first logic means, a first current electrode coupled to the input teminal of the first carry bit conductor, and a second current electrode coupled to the output terminal of the first carry bit conductor, for selectively coupling the input and output terminals of the first carry bit conductor; and a fourth transistor having a control electrode coupled to the output of the first logic means, a first current electrode coupled to the input terminal of the second carry bit conductor, and a second current electrode coupled to the output terminal of the second carry bit conductor, for selectively coupling the input and output terminals of the second carry bit conductor.

6. The carry propagate adder circuit of claim 5 wherein said third, fourth and fifth logic means are NOR gates.

7. The carry propagate adder circuit of claim 5 wherein said first, second, third and fourth transistors are N-channel MOS transistors.

8. The carry propagate adder circuit of claim 4 wherein said first and second logic means are exclusive OR gates.

9. The carry propagate adder circuit of claim 1 further comprising:
voltage equalizing means coupled across the first and second inputs of the sense amplifier means, for selectively coupling the first and second inputs of the sense amplifier together.

10. The carry propagate adder circuit of claim 9 wherein said voltage equalizing means comprise:
a transistor having a first current electrode coupled to the first input of the sense amplifier means, a second current electrode coupled to the second input of the sense amplifier means, and a control electrode coupled to a precharge control signal.

11. A method of adding two input bits in conjunction with a carry input bit, and providing a sum bit and a carry output bit, comprising the steps of:
providing two carry bit conductors, each having an input terminal and an output terminal;

precharging the carry bit conductors to a predetermined voltage level;

coupling a first and second input of sense amplifier means to the two carry bit conductors and coupling an output of the sense amplifier means to sum bit generation means;

coupling the two input bits to the sum bit generation means;

coupling carry bit generation means to both the sum bit generation means and the two carry bit conductors, for providing the carry output bit in response to the two input bits; and sensing a change in voltage level at the input terminals of the two carry bit conductors in response to coupling the carry input bit and a complement thereof to the input terminals of the two carry bit conductors, respectively, for providing the output sum bit in response to the voltage level change and the two input bits.

* * * * *